United States Patent [19]

Hähnke et al.

[11] Patent Number: 4,872,882
[45] Date of Patent: Oct. 10, 1989

[54] DYEING FORMULATIONS OF MIXTURES OF RED DISPERSE DYES FOR THE WASHFAST DYEING OF POLYESTER FIBERS OR MIXTURES THEREOF WITH CELLULOSE FIBERS: BENZO-DI-FURANONE AND AZO DYES

[75] Inventors: Manfred Hähnke, Kelkheim; Reinhard Kühn, Frankfurt am Main, both of Fed. Rep. of Germany

[73] Assignee: Hoechst Aktiengesellschaft, Frankfurt am Main, Fed. Rep. of Germany

[21] Appl. No.: 239,520

[22] Filed: Sep. 1, 1988

[30] Foreign Application Priority Data

Sep. 2, 1987 [DE] Fed. Rep. of Germany ....... 3729323
Oct. 3, 1987 [DE] Fed. Rep. of Germany ....... 3733505

[51] Int. Cl.$^4$ .................... C09B 23/08; C09B 67/22; D06P 3/54
[52] U.S. Cl. .......................... 8/638; 8/639; 8/532; 8/922; 8/933
[58] Field of Search ................ 8/638, 639, 532

[56] References Cited

U.S. PATENT DOCUMENTS 4,115,404  9/1978  Greenhalgh et al. ............... 8/471

FOREIGN PATENT DOCUMENTS 2060672  5/1981  United Kingdom .
2068402  8/1981  United Kingdom .

Primary Examiner—A. Lionel Clingman

[57] ABSTRACT

Dyeing formulations in solid or liquid form, containing one or more red disperse dyes of the general formula (1)

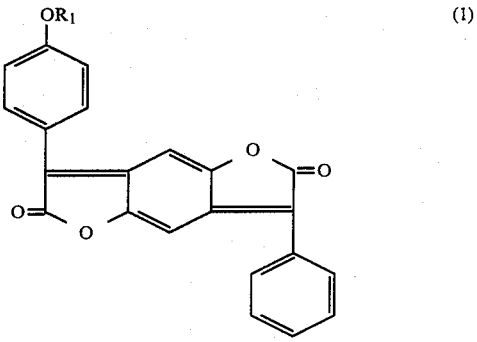

where $R_1$ denotes an alkyl group of 1 to 4 carbon atoms, and one or more red disperse dyes of the general formula (2)

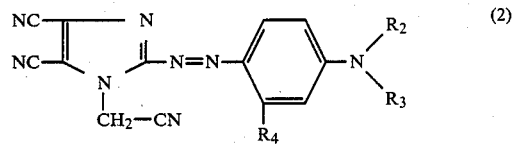

where $R_2$ and $R_3$ denote independently of each other the group $-CH_2-CH_2-CH_2-COOCH_3$ or $-CH_2-CH_2-CH_2-COOC_2H_5$ and $R_4$ denotes a hydrogen, chlorine or bromine atom or a methyl group, one or more anion-active or nonionic dispersing agents and optionally water, wherein, based on the mixing ratio of the pure dyes to one another, the dyes of the formula (1) are present in a proportion of 15 to 85 percent by weight and the dyes of the formula (2) in a proportion of 85 to 15 percent by weight, and wherein the dyes have been brought into a state of extremely fine division by conjoint or separate wet grinding in the presence of a dispersing agent, and the use thereof for dyeing or printing polyester fibers or mixtures of polyester and cellulose fibers.

5 Claims, No Drawings

DYEING FORMULATIONS OF MIXTURES OF RED DISPERSE DYES FOR THE WASHFAST DYEING OF POLYESTER FIBERS OR MIXTURES THEREOF WITH CELLULOSE FIBERS: BENZO-DI-FURANONE AND AZO DYES

The present invention relates to dyeing formulations in solid or liquid form of mixtures of red disperse dyes for the washfast dyeing of polyester fibers or mixtures thereof with cellulose fibers.

Textile materials, specifically articles in polyester fibers and mixtures thereof with cellulose fibers, must meet high washfastness requirements dictated by modern care habits. If these materials are easy care finished with synthetic resins and/or softeners, or if materials which have been treated with softeners are stored for prolonged periods at room temperature, it is barely possible with the present state of the art to obtain a satisfactory washfastness. The multifiber strip usually used as the adjacent material in the washfastness test always shows substantial staining, this being true in particular of the cellulose acetate and polyamide fiber portions present therein. This problem arises in particular with red shades.

There are in existence red disperse dyes which dyed onto polyester fibers give good fastness results but which under the practical conditions of HT exhaust dyeing, thermosoling and printing with HT steam give only shallow depths of shade and/or which in HT exhaust dyeing (in particular to deep shades), cannot be maintained in a stable state of fine division and consequently lead to spots, dye deposits and unlevelness, and which not only in HT exhaust dyeing but also in thermosoling and printing do not give a good dye yield or dyebath exhaustion.

They include dyes of the following constitution types I and II:

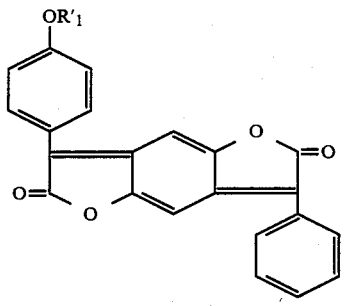

I

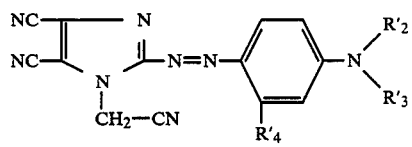

II

Dyes of said type I are described in British patent application No. 2,068,402. $R'_1$ in the said general formula of type I denotes a lower alkyl group.

The dyes of said type II are described in DE Offenlegungsschrift No. 3,035,912 (GB No. 2,060,672). In the said general formula of type II, $R'_2$ and $R'_3$ denote identical or different alkyl groups and $R'_4$ denotes a hydrogen, chlorine or bromine atom or an alkyl group.

It has now been found, surprisingly, that by mixing dyes of the said types I and II it is possible to obtain dyeing formulations having unexpectedly good dyeing properties and very good fastness results in the dyeing of polyester fibers or mixtures thereof with cellulose fibers, provided the dyes, subjected together or separately to a wet-grinding finish in the presence of dispersing agents, are used for dyeing in the form of a mixture.

The present invention accordingly provides dyeing formulations in solid or liquid form, containing one or more red disperse dyes of the general formula (1)

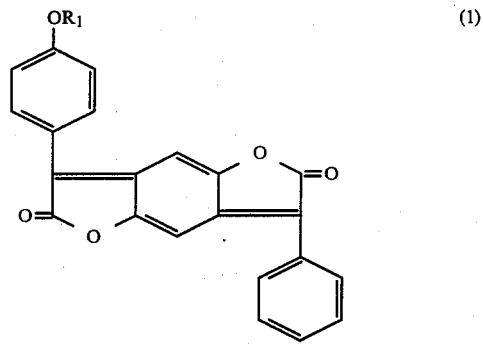

(1)

where $R_1$ denotes an alkyl group of 1 to 4 carbon atoms, and one or more red disperse dyes of the general formula (2)

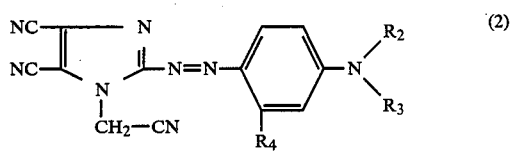

(2)

where $R_2$ and $R_3$ denote independently of each other the group —$CH_2$—$CH_2$—$CH_2$—$COOCH_3$ or —$CH_2$—$CH_2$—$CH_2$—$COOC_2H_5$ and $R_4$ denotes a hydrogen, chlorine or bromine atom or a methyl group, one or more anion-active or nonionic dispersing agents and optionally water, wherein, based on the mixing ratio of the pure dyes to one another, the dyes of the formula (1) are present in a proportion of 15 to 85 percent by weight and the dyes of the formula (2) in a proportion of 85 to 15 percent by weight, and wherein the dyes have been brought into a state of extremely fine division by conjoint or separate wet grinding in the presence of a dispersing agent.

Preference is given to dyeing formulations containing one or more red disperse dyes of the general formula (3)

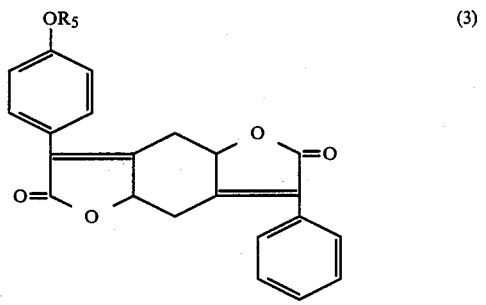

(3)

where $R_5$ denotes an alkyl group of 1 to 4 carbon atoms, and one or more red disperse dyes of the general formula (4)

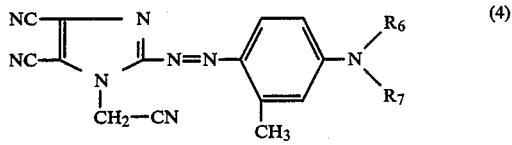

where $R_6$ denotes an ethyl, n-propyl or n-butyl group and $R_7$ denotes the group —$CH_2$—$CH_2$—$CH_2$—$COOCH_3$ or —$CH_2$—$CH_2$—$CH_2$—$COOC_2H_5$, wherein, based on the mixing ratio of the pure dyes to one another, the dyes of the formula (3) are present in a proportion of 30 to 70 percent by weight and the dyes of the formula (4) in a proportion of 70 to 30 percent by weight.

Particular preference is given to dyeing formulations containing the red disperse dye of the formula (5)

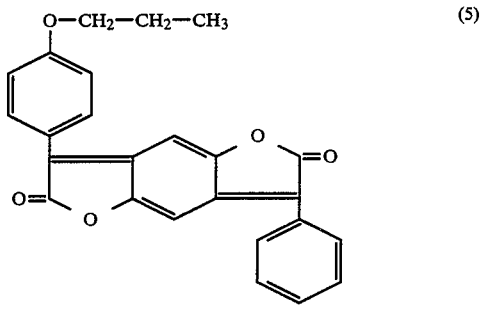

and the red disperse dye of the formula (6)

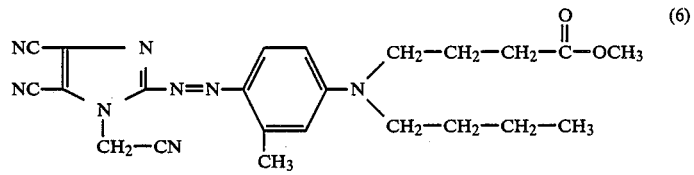

wherein, based on the mixing ratio of the two pure dyes to each other, dye (5) is present in a proportion of 30 to 70 percent by weight and dye (6) in a proportion of 70 to 30 percent by weight.

The dyeing formulations according to the invention may contain in addition to the said dye mixtures small amounts of further disperse dyes of different chemical constitution, as shading dyes.

The dispersing agents present in the dyeing formulations according to the invention may be any desired anion-active or nonionic dispersing agents of which there are a large number commercially available. It is also possible for mixtures of dispersing agents of the type mentioned to be present. Examples are cresol-formaldehyde condensation products and ligninsulfonates. Concerning the numerous dispersing agents of the categories mentioned, reference is made to "Lehrbuch der Textilchemie" by Hermann Rath, Springer-Verlag, second edition, 1963, pages 656-672.

The dye formulations according to the invention are applied in particular by the HT exhaust method to polyester fibers or mixtures thereof with cellulose fibers; however, they can also be applied by the thermosoling method or by printing with employment of HT steam.

The dyeing methods according to the invention together with the dye mixtures mentioned lead in HT exhaust at the customary dyeing temperatures of 125°-135° C. to very good color yields, to deep shades and to spotless, level dyeings. Thermosoling at temperatures between 190° and 220° C. and printing using HT steam likewise gives a high color yield and deep shades.

The dyeing formulations according to the invention produce excellent washfastness results not only on polyester fibers but also on mixtures of polyester and cellulose fibers.

The examples which follow serve to illustrate the invention without restricting it thereto. Parts and percentages are by weight.

EXAMPLE 1

To characterize the finishing and care habits customary today and to be able to assess the washfastness results obtainable, this example presents in a comparative series some typical practical situations involving prior art dyes.

A textile fabric comprising 65% polyester fibers and 35% cotton is dyed in a jet dyeing machine by the HT exhaust method with (a) 2% of the red disperse dye of the formula

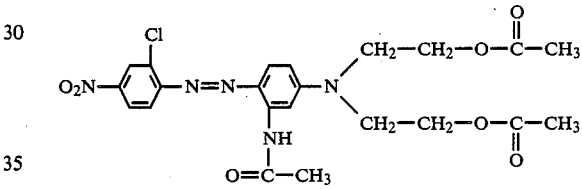

in commercially available form, (b) 1.5% of the red disperse dye of the formula in commercially available form, (c) 3% of the red disperse dye of the formula

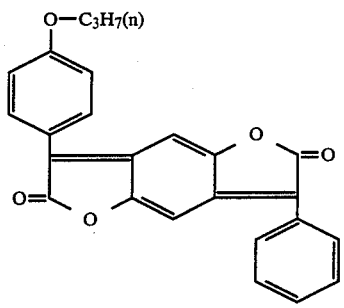

in commercially available form and/or with
(d) 2% of the red disperse dye of the formula

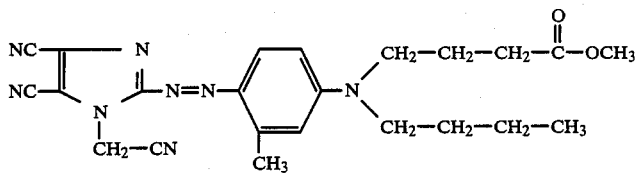

in commercially available form.

The dyeings are made ready as usual by rinsing and by reduction clearing with hydrosulfite/sodium hydroxide solution.

Drying is followed by application of an easy care finish using a commercially available glyoxal-urea resin, a commercially available fixing catalyst and a commercially available nonionic softener. The dyeings obtained are subjected to the following fastness tests:

washfastness test according to German Standard Specification DIN 54017/C2 (30 minutes at 60° C. in a liquor ratio of 50:1 with 4 g/l of ECE detergent composition (i.e. of a detergent composition complying with said German Standard Specification) and 1 g/l of sodium perborate and also with multifiber strip as adjacent material); and waterfastness test in accordance with German Standard Specification DIN 54006 (with multifiber strip as adjacent material).

Evaluation of the resulting dyeings and fastness properties gives the following result:

(a) Exhaustion of the dyebath up to 90%, marl in deep, bluish red shade of good levelness and the following inadequate fastness properties (rating 1=poor, rating 5=very good):

| Multifiber strip section | washfastness | waterfastness |
| --- | --- | --- |
| CA* | 2 | 3 |
| Co | 3 | 3 |
| PA | 1-2 | 2 |
| PES | 5 | 4 |
| PAC | 5 | 4 |
| Wo | 4 | 4 |

*CA = secondary cellulose acetate, Co = cotton, PA = polyamide-6,6, PES = polyester, PAC = polyacrylonitrile, Wo = wool (b) Exhaustion of the dyebath up to 95%, marl in deep ruby of good levelness and the following inadequate fastness properties:

| Mulfiber strip section | washfastness | waterfastness |
| --- | --- | --- |
| CA | 1-2 | 3 |
| Co | 3 | 2 |
| PA | 1 | 2 |
| PES | 4-5 | 4 |
| PAC | 4-5 | 4 |
| Wo | 4-5 | 4 |

(c) Exhaustion of the dyebath up to 55%, marl in a weak red shade showing spots/longitudinal strips and having the following good fastness properties:

| Multifiber strip section | washfastness | waterfastness |
| --- | --- | --- |
| CA | 4-5 | 5 |
| Co | 5 | 5 |
| PA | 4-5 | 4-5 |
| PES | 5 | 5 |
| PAC | 5 | 5 |
| Wo | 5 | 5 |

(d) Exhaustion of the dyebath up to 60%, marl in medium red shade having the following medium to good fastness properties:

| Multifiber strip section | washfastness | waterfastness |
| --- | --- | --- |
| CA | 4 | 3-4 |
| Co | 4-5 | 4 |
| PA | 4 | 3 |
| PES | 5 | 4-5 |
| PAC | 5 | 4-5 |
| Wo | 4-5 | 4-5 |

EXAMPLE 2

50 parts of the dye of the formula

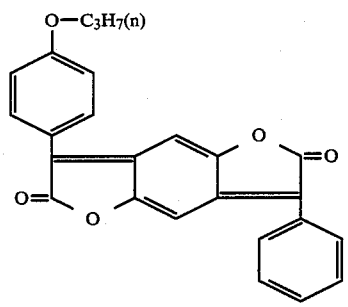

in commercially available form (comprising about 30 percent by weight of pure dyestuff and about 70 percent by weight of an anionic dispersing agent of the ligninsulfonate type) and 50 parts of the dyestuff of the formula

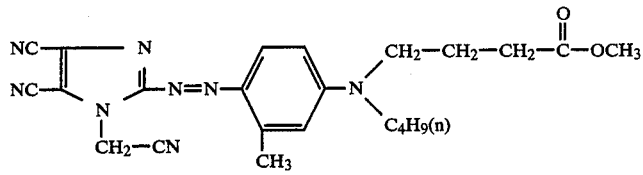

in commercially available form (comprising about 30 percent by weight of pure dyestuff and about 70 percent by weight of the same anionic dispersing agent as mentioned above) are mixed in a mixer. 3 parts of the mixture obtained are used for dyeing 100 parts of a polyester fiber yarn by the exhaust method at 130° C., a dyebath exhaustion of 96% being obtained. The dyeing is as usual reduction cleared, aftertreated by treatment with a bath containing 20 g/l of a cation-active softener of the type fatty amine ethoxylate and dried at 102°–105° C. A dyeing is obtained of very good wash and waterfastness:

| Multifiber strip section | washfastness | waterfastness |
| --- | --- | --- |
| CA | 4–5 | 4–5 |
| Co | 5 | 4–5 |
| PA | 4–5 | 4–5 |
| PES | 5 | 5 |
| PAC | 5 | 5 |
| Wo | 5 | 5 |

(Two dyes used in commercially available form had been prepared by bead milling the pure dyes in the presence of dispersing agents present in commercial form.)

EXAMPLE 3

12 parts of dye of the formula

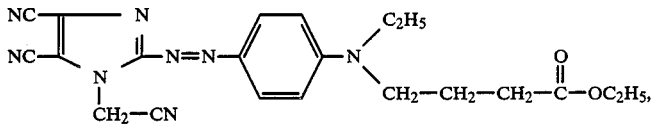

12 parts of the dye of the formula

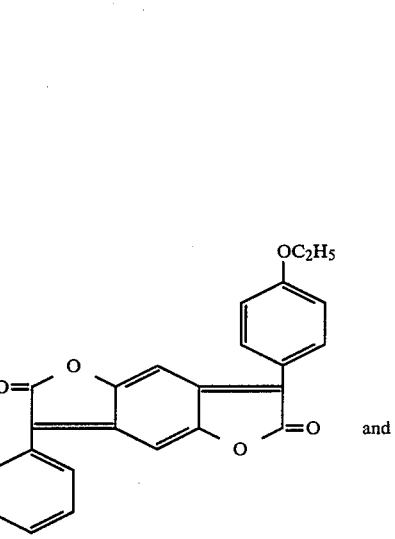

and 12 parts of the dye of the formula

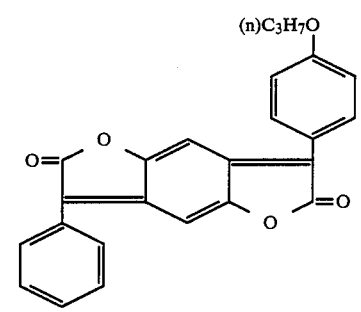

are brought together with 64 parts of a commercially available dispersing agent from the series of the ligninsulfonates and 200 parts of water in a bead mill in the form of a finely divided, stable dye dispersion which is subsequently converted into a dye powder by spray drying. The application of this formulation to a blend fabric in polyester and cellulose fibers by the HT exhaust method leads to a very high bath exhaustion and to a level dyeing of high fastness.

EXAMPLE 4

70 parts of the dye of the formula

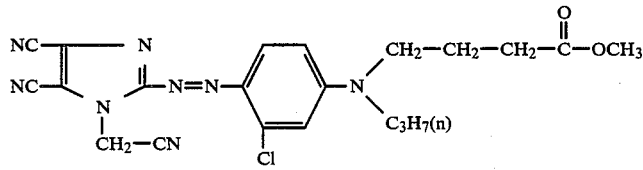

and 30 parts of the dye of the formula

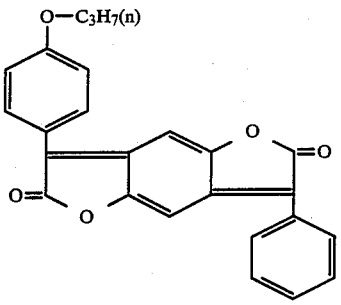

are bead-milled together in the presence of 150 parts of a commercially available dispersing agent of the type of a cresol-formaldehyde condensation product and 400 parts of water to prepare a liquid dye dispersion.

This dye dispersion is used to prepare the following dyeing liquor:
- 60 g/l of dye dispersion as described above,
- 15 g/l of a commercially available antimigration agent (polyacrylate type),
- 2 g/l of a commercially available wetting agent, sufficient acetic acid to set pH 5.

A fabric comprising a mixture of 60% of polyester staple fiber and 40% of cotton is padded at room temperature with the aforementioned dyeing liquor to a wet pickup of 60%. The fabric is then dyed at 100° C. and subsequently thermosoled at 220° C. for 60 seconds. It is then completed in a conventional manner with a reductive aftertreatment and a cross-dyeing of the cotton portion with commercially available reactive dyes. A maximum dye yield gives a deep red dyeing having very good fastness properties.

EXAMPLE 5

(comparative example to Example 4)

If dyeing is carried out not with the dye formulation used in Example 4, said dyeing formulation containing a dye mixture subjected to conjoint bead milling, but individually with each of the dyes described there, after the two individual dyes have been subjected to separate bead milling, as described there, in the presence of the dispersing agent mentioned there, this gives, if the dyeing procedure is otherwise as described in Example 4, only weak dyeings on the mixed fabric mentioned there.

EXAMPLES 6 TO 14

If, using the amounts (in parts) of dyes of the formulae (7) and (8)

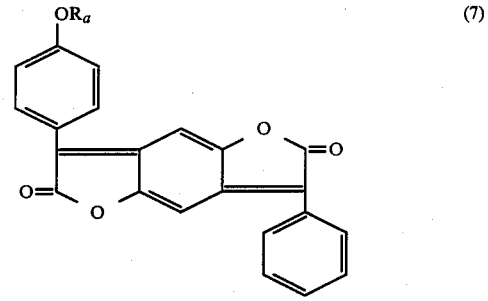

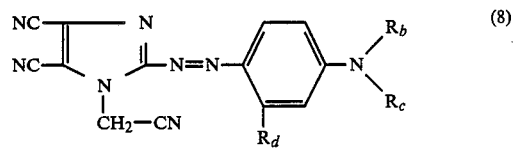

specified in the table below and commercially available dispersing agent based on a ligninsulfonate, dye formulations are prepared, the results obtained on polyester fibers or mixtures thereof with cellulose fibers are likewise deep red dyeings having very good fastness properties.

| Example | Amount of dispersing agent | Amount of dyes (7) and (8) | | Constitution of dyes (7) and (8) |
|---|---|---|---|---|
| 6 | 150 | 85 | (7) | $R_a = -CH_3$ |
|   |   | 15 | (8) | $R_b = R_c = -C_2H_5$, $R_d = -CH_3$ |
| 7 | 120 | 15 | (7) | $R_a = -C_2H_5$ |
|   |   | 85 | (8) | $R_b = -C_2H_5$, $R_c = -CH_2-CH_2-CH_2-COOCH_3$ $R_d = -CH_3$ |
| 8 | 200 | 50 | (7) | $R_a = -nC_3H_7$ |
|   |   | 25 | (8) | $R_b = R_c = -nC_4H_9$, $R_d = H$ |
|   |   | 25 | (8) | $R_b = R_c = -nC_4H_9$, $R_d = Br$ |
| 9 | 140 | 30 | (7) | $R_a = -CH_3$ |
|   |   | 70 | (8) | $R_b = R_c = -nC_4H_9$, $R_d = -CH_3$ |
| 10 | 150 | 50 | (7) | $R_a = -nC_4H_9$ |
|   |   | 50 | (8) | $R_b = R_c = -nC_4H_9$, $R_d = Cl$ |
| 11 | 170 | 40 | (7) | $R_a = -C_2H_5$ |
|   |   | 60 | (8) | $R_b = -C_2H_5$, $R_c = -CH_2-CH_2-CH_2-COOCH_3$ $R_d = -CH_3$ |
| 12 | 120 | 20 | (7) | $R_a = -CH_3$ |
|   |   | 20 | (7) | $R_a = -C_2H_5$ |
|   |   | 20 | (7) | $R_a = -nC_3H_7$ |
|   |   | 40 | (8) | $R_b = -nC_4H_9$, $R_c = -CH_2-CH_2-CH_2-COOC_2H_5$ $R_d = -CH_3$ |
| 13 | 130 | 40 | (7) | $R_a = -CH_3$, |
|   |   | 20 | (8) | $R_b = R_c = -C_2H_5$, $R_d = H$ |
|   |   | 20 | (8) | $R_b = R_c = -nC_2H_5$, $R_d = -CH_3$ |
|   |   | 20 | (8) | $R_b = R_c = -C_2H_5$, $R_d = Cl$ |
| 14 | 150 | 25 | (7) | $R_a = -C_2H_5$ |
|   |   | 25 | (7) | $R_a = -CH_3$ |

-continued

| Example | Amount of dispersing agent | Amount of dyes (7) and (8) | Constitution of dyes (7) and (8) |
|---|---|---|---|
| | | 25 (8) | $R_b$ = -nC$_4$H$_9$, $R_c$ = —CH$_2$—CH$_2$—CH$_2$—COOCH$_3$ $R_d$ = —CH$_3$ |
| | | 25 (8) | $R_b$ = -nC$_4$H$_9$, $R_c$ = —CH$_2$—CH$_2$—CH$_2$—COOCH$_3$ $R_d$ = H |

EXAMPLE 15

The dye formulation prepared as described in Example 3 is used to dye a package of 2.2 kg of polyester yarn in a manner complying with the following dyeing parameters:

liquor circulation alternately out to in/in to out every 2 minutes,
liquor ratio 15:1,
dispersing agent (commercially available): 1 g/l,
crystalline sodium acetate: 2 g/l,
60% strength acetic acid: 3 ml/l,
dye formulation: 3%,
Disperse Red C.I. 167:1 (commercially available form): 0.5%,
temperature at start of dyeing: 70° C.,
heating up to 130° C. in the course of 30 minutes,
dyeing temperature and time: 130° C. 40 minutes,
finishing by cooling, rinsing, soapoff at the boil.

The result obtained on the yarn is a deep red dyeing of complete levelness and high wetfastness properties.

EXAMPLE 16

(comparative example to Example 15)

If Example 15 is repeated not with the dye formulation prepared as described in Example 3 but with the dye formulation prepared in a similar manner from 36 parts of the disperse dye of the formula

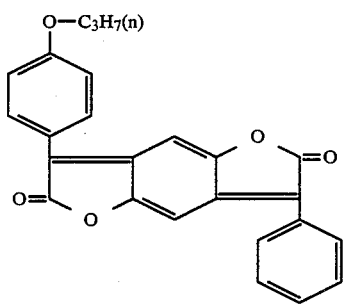

and 64 parts of the same dispersing agent (based on ligninsulfonate), the result obtained on the polyester yarn is a dyeing of substantial unlevelness and substantial dye deposits on the inner and outer layers and on the end face of the dyeing package.

We claim:

1. Dyeing formulations in solid of liquid form, containing one or more red disperse dyes of the general formula (1)

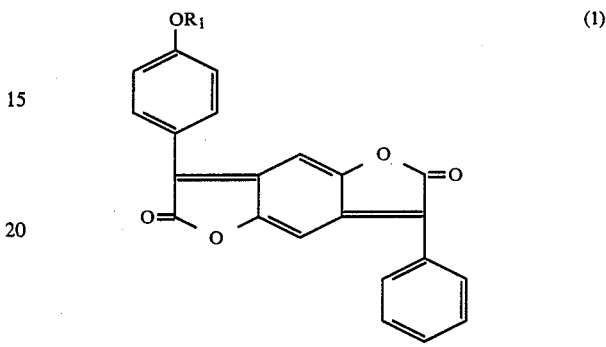

where $R_1$ denotes an alkyl group of 1 to 4 carbon atoms, and one or more red disperse dyes of the general formula (2)

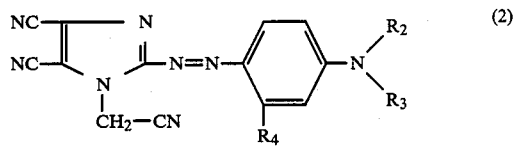

where $R_2$ denotes the group ethyl, n-propyl, n-butyl, —CH$_2$—CH$_2$—CH$_2$—COOCH$_3$ or —CH$_2$—CH$_2$—CH$_2$—COOC$_2$H$_5$, $R_3$ denotes an ethyl, n-propyl or n-butyl group, and $R_4$ denotes a hydrogen, chlorine, or bromine atom or a methyl group, one or more anionactive or nonionic dispersing agents and optionally water, wherein, based on the mixing ratio of the pure dyes to one another, the dyes of the formula (1) are present in a proportion of 15 to 85 percent by weight and the dyes of the formula (2) in a proportion of 85 to 15 percent by weight, and wherein the dyes have been brought into a state of extremely fine division by conjoint of separate wet grinding in the presence of a dispersing agent.

2. A method for dyeing or printing polyester fibers or mixtures of polyester fibers and cellulose fibers comprising dyeing or printing said fibers with a dyestuff formulation of claim 1.

3. A method for dyeing polyester fibers or mixtures of polyester fibers and cellulose fibers by the HT exhaust method or thermosoling method comprising dyeing said fibers with a dyestuff formulation of claim 1.

4. A method for printing polyester fibers or mixtures of polyester fibers and cellulose fibers employing HT steam comprising printing said fibers with a dyestuff formulation of claim 1.

5. Dyeing formulations claimed in claim 1, wherein, based on the mixing ratio of the pure dyes to one another, the dyes of the formula (1) are present in a proportion of 30 to 70 percent by weight and the dyes of the formula (2) in a proportion of 70 to 30 percent by weight.

* * * * *

UNITED STATES PATENT AND TRADEMARK OFFICE
CERTIFICATE OF CORRECTION

PATENT NO. : 4,872,882
DATED : October 10, 1989
INVENTOR(S) : Manfred Hahnke Et Al.

It is certified that error appears in the above-identified patent and that said Letters Patent is hereby corrected as shown below:

Column 11, line 67, "of" should read --or--.

Signed and Sealed this

First Day of January, 1991

Attest:

HARRY F. MANBECK, JR.

*Attesting Officer*     Commissioner of Patents and Trademarks